Jan. 27, 1931.  J. SLEPIAN  1,790,171
MAGNETIC RADIO RECEIVER
Filed April 21, 1921
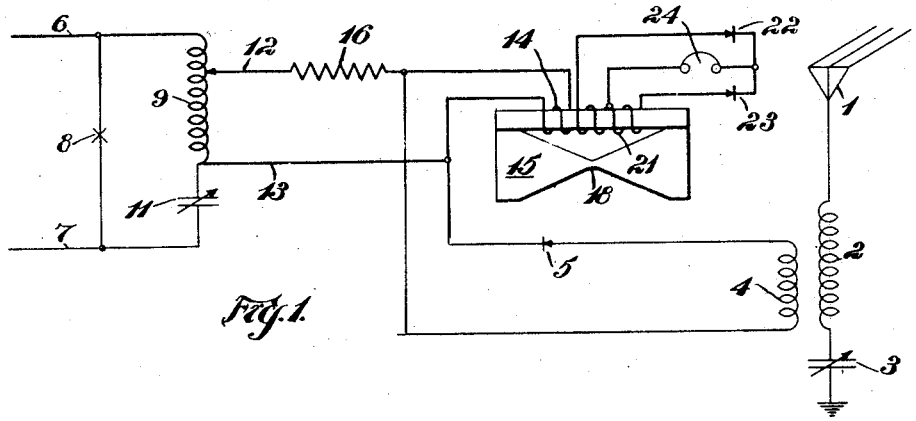
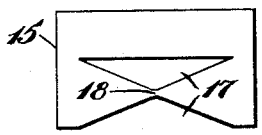
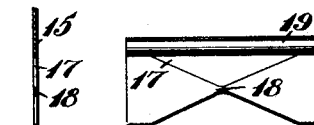
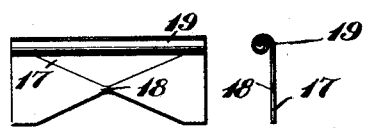
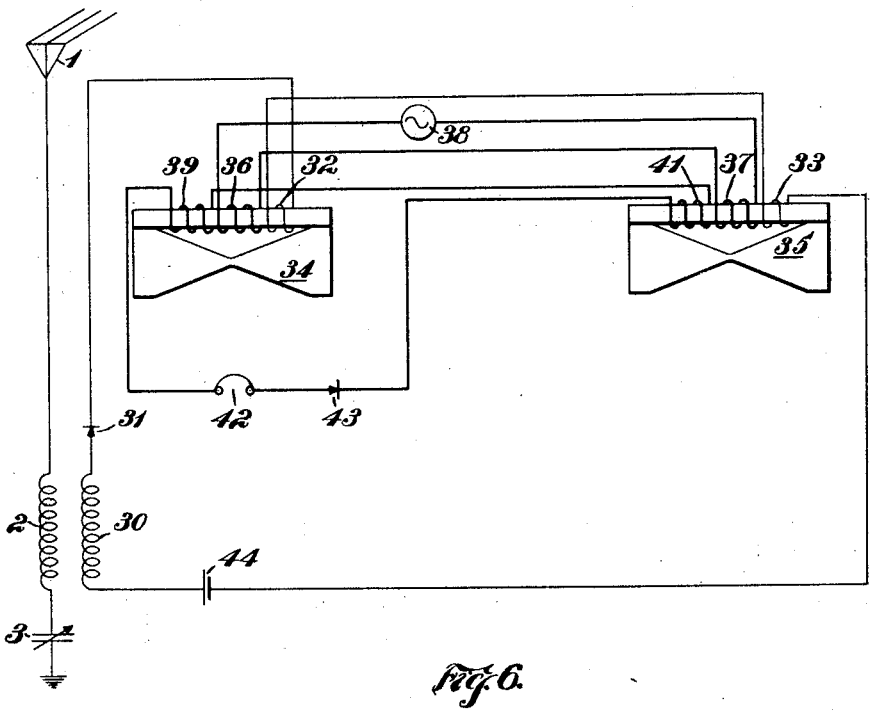
WITNESSES:
INVENTOR
Joseph Slepian
BY
Wesley G. Carr
ATTORNEY Patented Jan. 27, 1931

1,790,171

UNITED STATES PATENT OFFICE

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA

MAGNETIC RADIO RECEIVER

Application filed April 21, 1921. Serial No. 463,207.

My invention relates to electro-magnetic relays and to means for amplifying the effects of a current and, more particularly, it relates to the amplification of received signal current by utilizing the saturation properties of iron.

One object of my invention is to devise a system for utilizing the saturation properties of iron to accomplish the amplification of current effects, and, more especially, of receiving signal current.

Another object of my invention is to provide a form of transformer particularly adapted for use with my amplifying system.

A further object is to provide a system for the amplification of signal current in which a local source of radio-frequency alternating current is modulated by the incoming signals, whereby speech-modulated signals in telephony may be reproduced.

For the amplification of current effects, such as received signal-current, amplifier vacuum tubes are customarily employed. The receiving circuits for the use of vacuum tubes as amplifiers comprise plate and filament batteries and a grid battery or grid-leak resistance and condenser, which, together with the means for coupling the circuits, tends to complicate the apparatus. The vacuum tubes are quite delicate and subject to breakage, particularly when subjected to sudden shocks or jars that may disarrange the electrodes within the tube and render it inoperative. This particularly obtains when vacuum-tube amplifiers are used in war tanks or aeroplanes, where trouble is continually experienced with the vacuum tubes. Furthermore, the life of vacuum tubes, under the most ideal conditions, is comparatively limited.

My invention overcomes the above-mentioned objections by providing an electromagnetic relay utilizing the saturation properties of iron to amplify the current effects. A source of alternating current is coupled to the primary winding of an iron-core transformer, and a source of current, the effects of which are to be amplified, is likewise in circuit with the primary winding of the transformer. When the effects of signal current are to be amplified, the signal current is rectified before being fed into the circuit comprising the source of alternating current and the primary winding of the transformer. A resistor is connected in the circuit between the alternating-current source and the point of connection of the rectified signal current. A secondary coil wound on the iron core of the transformer and a pair of oppositely connected rectifiers in the circuit of the secondary coil are provided. Telephone receivers are connected between the rectifiers and the middle point of the secondary coil.

The transformer core which I customarily employ is one employing a small amount of iron and preferably so formed that there is a small path for the passage of the flux in the iron. The flux lines are, therefore, closely crowded together so that a comparatively feeble direct current will cause saturation effects in the core.

In another modification, connections are made as in the well-known frequency doubler utilizing the saturation properties of iron; the means for detecting the amplified effects of the current are located in the circuit carrying the double-frequency output, and the current to be amplified traverses separate windings on the transformer cores. The amplification of current effects is obtained in this modification, as in the one previously outlined, by reason of the saturation properties of iron.

In my invention, I provide an iron-core transformer operated near the knee of the saturation curve. An increase in the magnetizing current is brought about by the unidirectional or rectified signal current. The rectified signal current brings the saturation of the iron core well up along the knee of the saturation curve. Since the power delivered by a transformer depends entirely upon the inductive effect of the primary winding upon the secondary winding, any diminution of the inductive effect will decrease the power in the secondary winding. By causing the rectified signal current to make the transformer operate above the knee of the saturation curve, the inductive effect of the primary winding upon the secondary winding is greatly reduced, since a large increase in the magnetizing current, when operating the core above the knee of the saturation curve, produces but very little increase in the flux. The decrease in inductive effect, caused by the incoming signal, is utilized to affect telephone receivers located in circuit with the secondary winding of the transformer, whereby the effect of the feeble received signal oscillations is greatly amplified.

If the local source of alternating current supplying the current to the primary winding of the transformer has a frequency well above the range of audibility, the received signal current, whether speech-modulated, heterodyned, or otherwise modulated, will be amplified by my system and will be perfectly reproduced in my telephone detectors.

The higher the frequency of the local alternating current the greater the effect on the current output in the secondary winding of the transformer, for any given signal current input. Consequently, a greater amplification is secured by the employment of a local source of current of very high frequency.

In the drawings:

Figure 1 is a diagram illustrating one form of my magnetic relay utilizing the saturation properties of iron.

Fig. 2 is a front elevation of the blank from which one form of my transformer core is made, before the winding support has been rolled up.

Fig. 3 is a sectional view taken on the line 3 of Fig. 2.

Fig. 4 is a front elevation of my transformer core after the winding support has been rolled into position.

Fig. 5 is a sectional view taken on the line 5—5 of Fig. 4:

Fig. 6 is a diagram illustrating a modification comprising another magnetic amplifying system utilizing the saturation properties of iron.

In Fig. 1 is shown an antenna circuit comprising an antenna 1, an inductance coil 2 and a variable condenser 3 from whence the system is connected to ground. By regulating the value of the variable condenser 3, the antenna system may be tuned to any desired frequency. In inductive relation to the inductance device 2 is an inductance device 4 located in a circuit comprising the inductance device 4 and a current-rectifier 5. The power input through which the amplification of the signal current is effected is supplied through mains 6 and 7 having an arc oscillator 8 located therebetween, the oscillator being shunted by a tuned resonant circuit comprising an inductance coil 9 and a variable condenser 11. The oscillator circuit, by proper adjustments of the arc oscillator and of the variable condenser 11, will give any desired frequency of input.

It is to be understood that the system I have shown for giving the alternating-current input is not a necessary part of my invention, since a high-frequency alternator, or a three-electrode vacuum-tube generator, or, in fact, any other source of alternating current of high frequency may be employed. Conductively connected to the inductance device 9 are leads 12, and 13, whereby power is supplied to a winding 14 acting as a primary member and wound on a transformer core 15.

The rectified signal circuit, comprising the inductance coil 4 and the current-rectifier 5, is conductively connected to the leads 12 and 13, and a resistor 16 is located between the juncture of one lead of the rectified signal-current circuit with the lead 12. The resistance of the device 16 is of such value as to prevent any substantial loss of the rectified signal-current input in the inductance coil 9.

The transformer 15 is formed of a flat sheet of metal, as shown in Fig. 3. In Figs. 2 and 3, the flat sheet-metal piece is shown stamped out with two V-shaped portions 17 cut from the sheet metal producing a portion of relatively small cross sectional area at 18 at the points of the V's to form a restricted path for the flux. In Figs. 2 and 3, the sheet-metal blank has not been shaped to form a winding-support and, in that position, the upper part of the sheet is shown as flat. In Figs. 4 and 5, the formation of a winding-support 19 is shown; constructed by rolling the upper part of the metal of the transformer 15 upon itself to form a cylindrical support for the windings of the transformer.

Wound upon the winding-support 19 is a secondary coil 21. The circuit comprising the secondary coil 21 comprises a rectifier 22 allowing the passage of current in one direction and a rectifier 23 allowing the passage of current in the other direction. Between the rectifiers 22 and 23 is connected a lead to telephone receivers 24. The other lead from the telephone receivers 24 passes to the middle point of the secondary coil 21.

By the arrangement just described, any change in the amount of current induced in the secondary coil 21 will react upon the telephone receivers 24 to proudce an audible signal, since the direction of the current through the rectifier 22 and the telephone receiver 24 is the same as the direction of the current through the rectifier 23 and the telephone receivers 24, with the result that a unidirectional current flows in the telephone receivers for both half-cycles of any alternating current induced in the secondary coil 21.

In operation, radio oscillations having been caught by the antenna circuit comprising the antenna 1, the inductance coil 2 and the variable condenser 3, oscillations are induced in the circuit comprising the inductance coil 4, which is inductively coupled to the antenna inductance coil 2, and the rectifier 5. The rectifier 5 causes unidirectional signal current to flow in the circuit. Alternating current is supplied to the leads 12 and 13, and the unidirectional signal current is superimposed upon this alternating current. The transformer core 15 is of such dimensions that the flux induced by the primary winding 14 causes the transformer to operate close to the knee of the saturation curve of the iron.

The unidirectional signal current, added to the alternating current from the leads 12 and 13, brings the iron of the core 15 above the knee of the saturation curve, causing a great loss in the efficiency of the transformer, whereby the power derived from the secondary winding 21 is greatly lessened. By the connection of the telephone receivers 24 between the rectifiers 22 and 23 and the middle point of the secondary coil 21, any change in the amount of current flowing in the secondary coil 21 will produce audible effects in the telephone receivers. Thus, the effect of the received signal current is greatly amplified by reason of the saturation properties of iron, and an extremely feeble signal may be caught in the telephone receivers.

This system works equally well whether the modulated rectified signal input is from spark or chopper, or whether the input is from received telephonic waves impressed with speech vibrations. My system is equally adapted for the receipt of heterodyned telegraphic waves. The local source of high frequency is preferably well above the range of audibility, and the speech modulations in the received signal current are, therefore, clearly and accurately reproduced in the telephone receivers.

In the modification shown in Figure 6, an inductance coil 30 is inductively coupled to the inductance coil 2 of the antenna circuit. The circuit comprising the coil 30 has a rectifier 31 and saturating windings 32 and 33, wound, respectively, upon transformer cores 34 and 35, similar to the transformer core 15 shown in the modification illustrated diagrammatically in Fig. 1.

The transformer cores 34 and 35 are further provided with primary windings 36 and 37, locatd in a circuit comprising a source of high-frequency alternating current 38, which may be either of audio or radio frequency, as will be later explained. Likewise wound upon the transformer cores 34 and 35 are secondary windings 39 and 41 connected in series with telephone receiver 42 and a rectifier 43. The primary windings 36 and 37 are assumed to be similarly wound upon the cores 34 and 35. The secondary windings 39 and 41 and the saturating windings 32 and 33 are connected in such manner that they are oppositely wound on the respective transformer cores 34 and 35. The circuit comprising the telephone receiver 42 therefore receives a double-frequency electromotive force which varies in accordance with the received signals. I have shown a battery 44, which may be connected in the saturating winding circuit in order to give an initial bias on the transformers, whereby the most efficient operating condition may be obtained, if necessary.

The transformer cores 34 and 35 are so constructed that the alternating-current input to the primary windings 36 and 37 causes the cores to operate around the knee of the saturation curve for iron. A double frequency output is obtained in the circuit comprising the telephone receiver 42 which varies in accordance with the rectified signal current input. When rectified signal current flows through the saturating windings 32 and 33, by reason of the inductive connection between the antenna inductance 2 and the inductance 30, the cores 34 and 35 are brought above the knee of the saturation curve, and a corresponding double-frequency output is produced in the telephone receiver circuit. Since the secondary windings 39 and 41 are wound in opposite directions on the iron cores 34 and 35, respectively, the voltages induced therein when the unidirectional current is zero are opposite in phase and tend to cancel each other.

In telegraphy, for receiving continuous waves which have not been heterodyned or otherwise modulated at an audible frequency, it is necessary to have the source of high-frequency alternating current 38 well within the audible range in order to ensure that the double frequency output through the telephone receiver 42 shall be within the audible range, whereby a change in the output may be readily detected. In this case, it will not be necessary to have the rectifier 43 in circuit with the telephone receiver 42.

Where a continuous wave, which is either heterodyned or operated upon by a chopper, is received, the local source 38 must be beyond the range of audibility. It is then necessary to have the rectifier 43 in the circuit so that the pulses in the telephone receiver 42 will be unidirectional. Where spark or speech-modulated waves are the received input from the antenna circuit, there must likewise be a rectifier in the circuit, comprising the telephone receiver, or, in the case of telegraphic signals, the signal-current rectifier 31 may be omitted, and the signal currents may be heterodyned with the local source 38 to produce an audible note, either with or without the rectifier 43 in the receiver circuit.

By my system, I have made it possible to receive speech-modulated radio waves or radio waves of any other type, and to amplify them by causing them to alter the output in a secondary winding of a transformer having input from a local source of alternating current. The amplification takes place by reason of operating the transformer near the knee of the saturation curve of the iron, whereby the rectified signal input will cause the transformer to operate over the knee of the curve, with a consequently great and easily detected loss in the output or secondary circuit.

It will be understood that the separate windings 39 and 41 and the biasing battery 44, shown in Fig. 6, may be employed without making use of the heterodyning feature. Other modifications of my invention will likewise be obvious to those skilled in the art. I do not wish to be restricted, therefore, to the herein described embodiments, which have been shown merely for purpose of disclosing my invention and illustrating the principles thereof, but I desire that only such restrictions shall be placed upon my invention as are set forth in the appended claims.

I claim as my invention:

1. The combination with an iron-core inductance device, of a source of modulated radio-frequency current, means for rectifying said current, and means for causing said rectified current to produce a correspondingly modulated saturation in said inductance device.

2. The combination with a local ultra-audio-frequency circuit including an iron-core inductance device, of a source of audibly-modulated, ultra-audio-frequency current, means for rectifying said current and means for causing said rectified current to produce a correspondingly modulated degree of saturation in said inductance device.

3. An electric relay comprising a signal-current circuit, frequency-multiplying means operatively associated with said signal-current circuit whereby the high-frequency current output of said frequency-multiplying means is caused to change in accordance with said signal current and means responsive to said changes in the high-frequency output.

4. An electric relay comprising a signal-current circuit, frequency-multiplying means operatively associated with said signal-current circuit whereby the high-frequency-current output of said frequency-multiplying means is caused to change in accordance with said signal current and a source of energy for said frequency-multiplying means having a frequency sufficiently high to cause said high-frequency-current output to have an ultra-audible frequency.

5. An electro-magnetic relay comprising a circuit carrying unidirectional signal current, iron-cored frequency-multiplying means inductively related to said signal-current circuit, whereby the current output of said frequency-multiplying means is caused to change by reason of the saturation effect of said unidirectional signal current and means responsive to said changes in the current output.

6. An electro-magnetic relay comprising an iron-core transformer having primary and secondary windings, a source of alternating current operatively associated with said primary windings, and a circuit carrying unidirectional signal current operatively associated with said primary windings, said signal current varying in strength around a mean value sufficient to energize the core of said transformer at approximately the knee of the magnetization curve.

7. An amplifying relay comprising a pair of iron-core transformers, a source of alternating current, primary windings connected to be energized from said source in such manner as to be similarly wound upon the cores of the respective transformers, saturating windings connected to be oppositely wound upon the respective transformer cores, a signal-current circuit, means for so associating said signal-current circuit with said saturating windings that pulsating unidirectional magnetic effects are produced, secondary windings connected to be oppositely wound upon the respective transformer cores and a translating device connected to said secondary windings.

8. An amplifying relay comprising a pair of iron-core transformers, a source of ultra-audio-frequency current, primary windings connected to be energized from said source in such manner as to be similarly wound upon the cores of the respective transformers, other windings connected to be oppositely wound upon the respective transformer cores, a signal-current circuit, means for so associating said signal-current circuit with said second-mentioned windings that pulsating uni-directional magnetic effects are produced and a translating device responsive to the high-frequency currents in said oppositely-wound windings.

9. A frequency-multiplying system comprising a pair of iron-core transformers, a source of alternating current, primary windings connected to be energized from said source in such manner as to be similarly wound upon the cores of the respective transformers, secondary windings connected to be oppositely wound upon the respective transformer cores and means for producing unidirectional saturation in opposite directions in the respective transformer cores.

10. Apparatus for amplifying the effects of electrical currents comprising a transformer core, a secondary circuit, an ultra-audio-frequency circuit, means for causing the currents the effect of which is to be amplified to produce saturation effects in the transformer core, whereby there will be an amplified effect on the current flowing in the secondary circuit and a rectifier and a telephone receiver connected in said secondary circuit for detecting the resulting fluctuations in output.

11. An electro-magnetic relay comprising an iron transformer core, a source of alternating current in inductive relation to said core, a source of unidirectional signal current connected in shunt across said alternating-current source, a resistor in the circuit between said alternating-current source and said shunt connection and means in inductive relation to said core for detecting changes in current.

12. The combination with a circuit carrying modulated alternating currents, of impedance means associated therewith, a pair of oppositely-connected rectifiers connected in series across said impedance means and a detecting device connected between the common terminal of said rectifiers and an intermediate point on said impedance means.

13. The combination with a circuit carrying audibly-modulated, ultra-audio-frequency currents, of impedance means associated therewith, a pair of oppositely-connected rectifiers connected in series across said impedance means and a telephone receiver connected between the common terminal of said rectifiers and an intermediate point on said impedance means.

14. An electro-magnetic relay comprising an iron transformed core, a source of alternating current in inductive relation to said core, a source of signal current in inductive relation to said core, a rectifier in circuit with said signal-current source, and means in inductive relation to said core for detecting changes in the induced current output.

15. The combination with an iron-core magnetic frequency-multiplier system, of a source of modulated radio-frequency current and means for causing said current to alter the degree of the iron-core saturation in said frequency-multiplier system.

16. The combination with an iron-core inductance device, of a local alternating-current circuit including said device, a source of uni-directional signal current and means for causing said signal current to produce a correspondingly modulated degree of saturation of said inductance device.

17. The combination with an iron-core inductance device, of a local alternating-current circuit including said device and energizing the same to a degree corresponding to the knee of its magnetization curve, a source of uni-directional signal current and means for superimposing the magnetic effects of said uni-directional current upon said inductance device.

18. The combination with a local source of alternating-current, of a pair of iron-core inductance devices energized from said source, a modulating circuit magnetically associated with said inductance devices in such manner that at every instant the modulating-current flux flows in the same direction as the local-current flux in one of said inductance devices and against the local-current flux in the other of said inductance devices and a translating device connected in such manner as to be responsive to the difference between the electromotive forces induced in said inductance devices.

19. The combination with a local source of alternating-current, of a pair of iron-core inductance devices energized from said source, a modulating circuit magnetically associated with said inductance devices in such manner that, at every instant, the modulating-current flux flows in the same direction as the local-current flux in one of said inductance devices and against the local-current flux in the other of said inductance devices, a translating device connected in such manner as to be responsive to the difference between the electromotive forces induced in said inductance devices and means whereby said inductance devices are respectively provided with unidirectional components of magnetization flowing in opposite directions with respect to the currents in said local circuit.

20. In an electric intelligence transmitting system of a type utilizing saturation effects in an iron-core transformer for translating the received currents, the combination with the circuits of the receiving station, of a transformer employing a small amount of iron commensurate with the weak signals received, said transformer being further provided with a restricted path for the passage of the flux in the iron.

21. The combination with a local high-frequency carrier-current circuit including an iron-core inductance device, of a source of modulated carrier current and means for causing said current to alter the degree of saturation in said inductance device, the iron core of said inductance device being of sheet metal having a winding-support formed of the metal of the sheet rolled on itself, the remainer of the sheet being so formed as to provide a return flux-path of relatively small cross-sectional area.

22. In a signalling system, a device for amplifying feeble received currents, comprising a transformer core of sheet metal having a winding-support formed of the metal of the sheet rolled on itself, the remainder of the sheet being so formed as to provide a return path of relatively smaller cross-section for the flux, means for energizing said core with direct current to a point near the knee of the saturation curve, means for causing the received currents to vary the degree of saturation, and a circuit responsive to the altered saturation, the core being so small that comparatively feeble direct current and signal currents shall cause said saturation effects in the core.

23. A sheet-metal transformer core comprising a winding-support formed of the metal of the sheet rolled upon itself and a flux restricting portion with V-shaped pieces cut from the sheet metal to form a restricted path for the flux adjacent the points of the V's, and a radio receiving circuit directly coupled to said transformer core, the core being of a small size such that the feeble received currents shall be able to effect substantial changes in the degree of saturation of the core.

24. The method of utilizing an iron-cored inductance device to amplify the effect of a modulated radio-frequency current which comprises periodically varying the saturation of said core, rectifying said current and causing said rectified current to alter the effective degree of saturation of said core.

25. The method of utilizing an iron-cored inductance device to amplify the effect of a modulated radio-frequency current which comprises varying at a period above audition of the saturation of said core, rectifying said current, applying the rectified current to the inductance device to alter the effective degree of saturation of said core and detecting the output from said inductance device.

In testimony whereof, I have hereunto subscribed my name this 14th day of April, 1921.

JOSEPH SLEPIAN.